Figure 1:
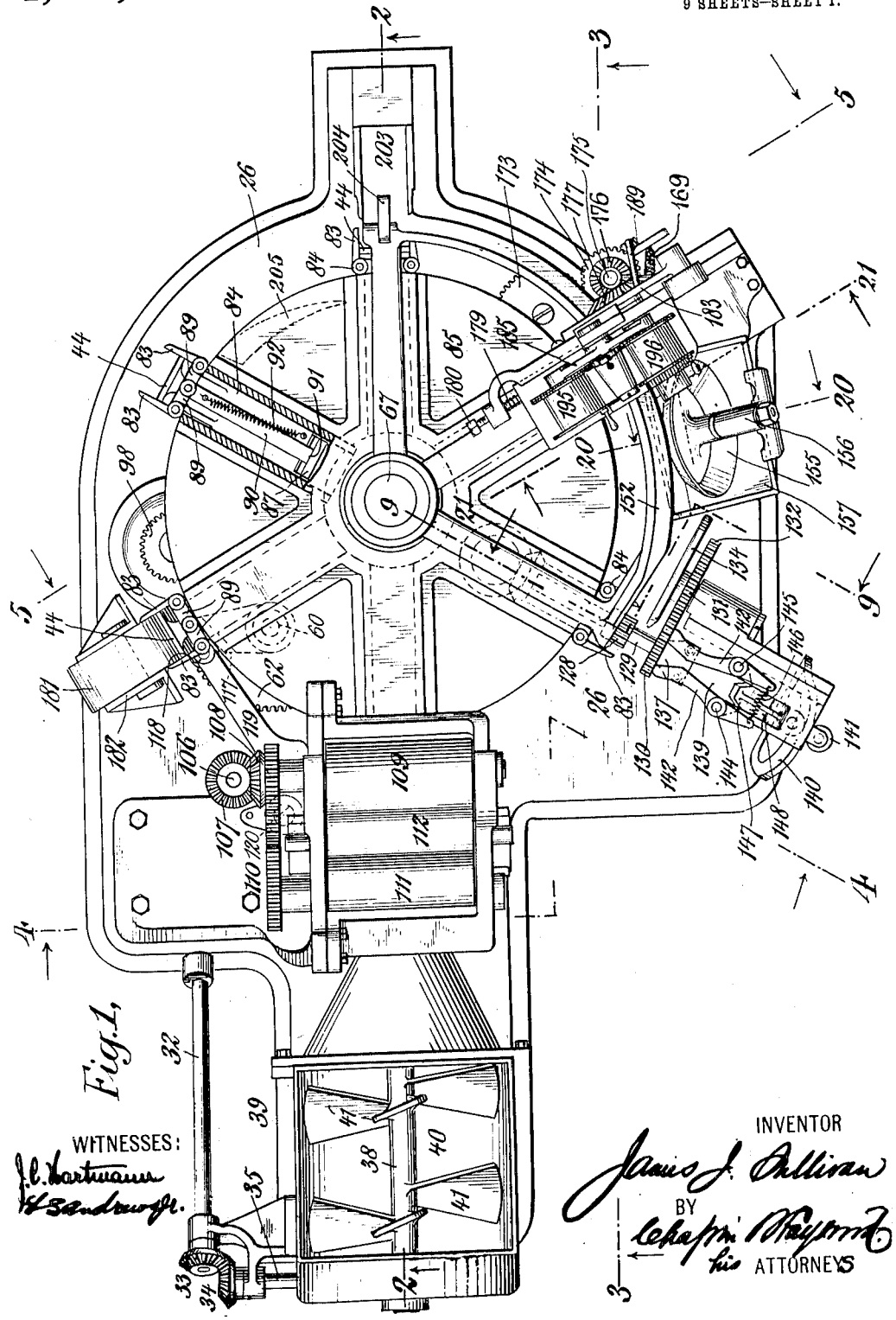

J. J. SULLIVAN.
WRAPPING MACHINE.
APPLICATION FILED MAR. 24, 1909.

1,001,179.

Patented Aug. 22, 1911.
9 SHEETS—SHEET 1.

WITNESSES:

INVENTOR
James J. Sullivan
BY
his ATTORNEYS

J. J. SULLIVAN.
WRAPPING MACHINE.
APPLICATION FILED MAR. 24, 1909.
1,001,179.
Patented Aug. 22, 1911.
9 SHEETS—SHEET 2.
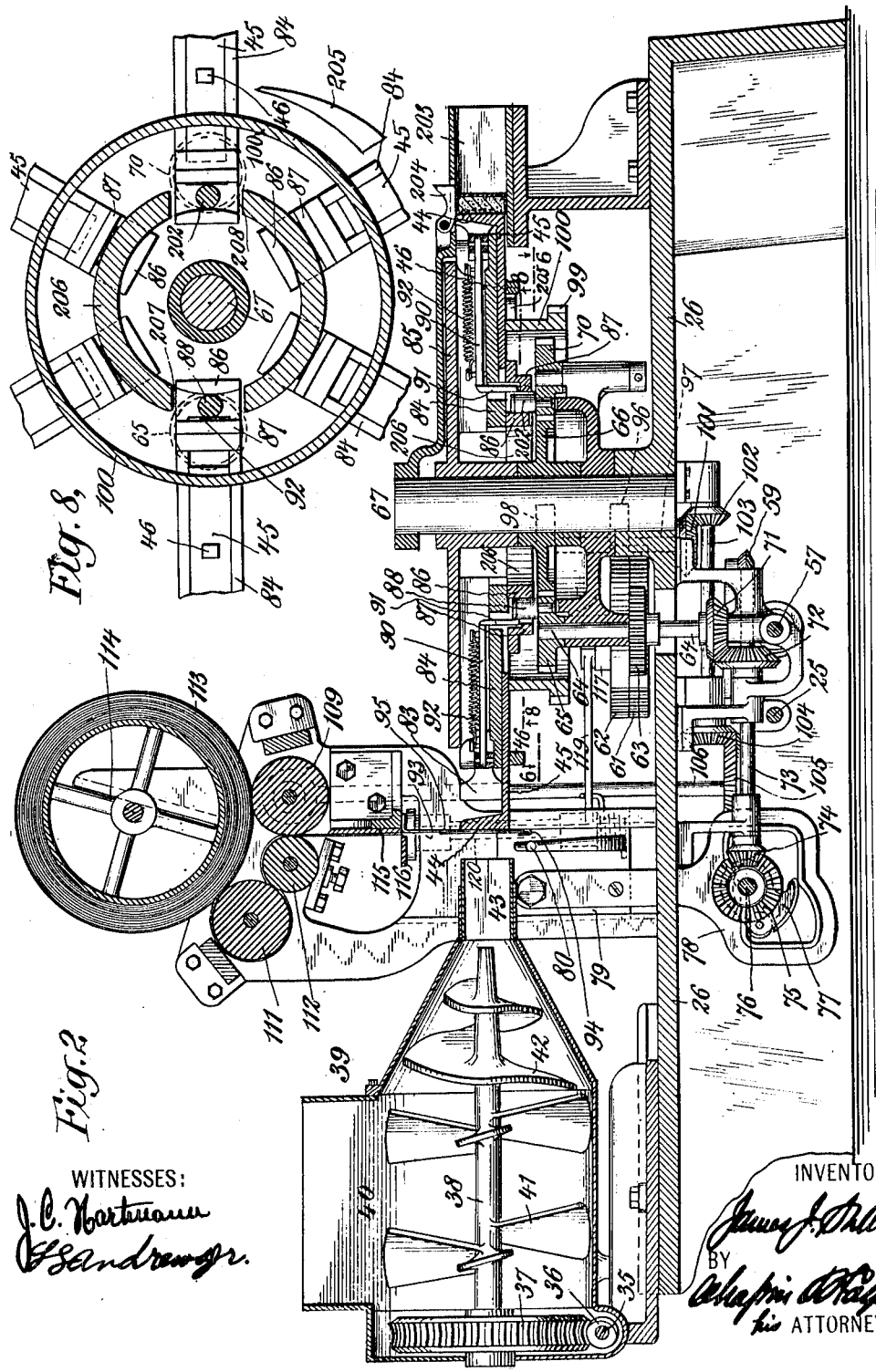
WITNESSES:
INVENTOR
BY
his ATTORNEYS J. J. SULLIVAN.
WRAPPING MACHINE.
APPLICATION FILED MAR. 24, 1909.
1,001,179.
Patented Aug. 22, 1911.
9 SHEETS—SHEET 3.
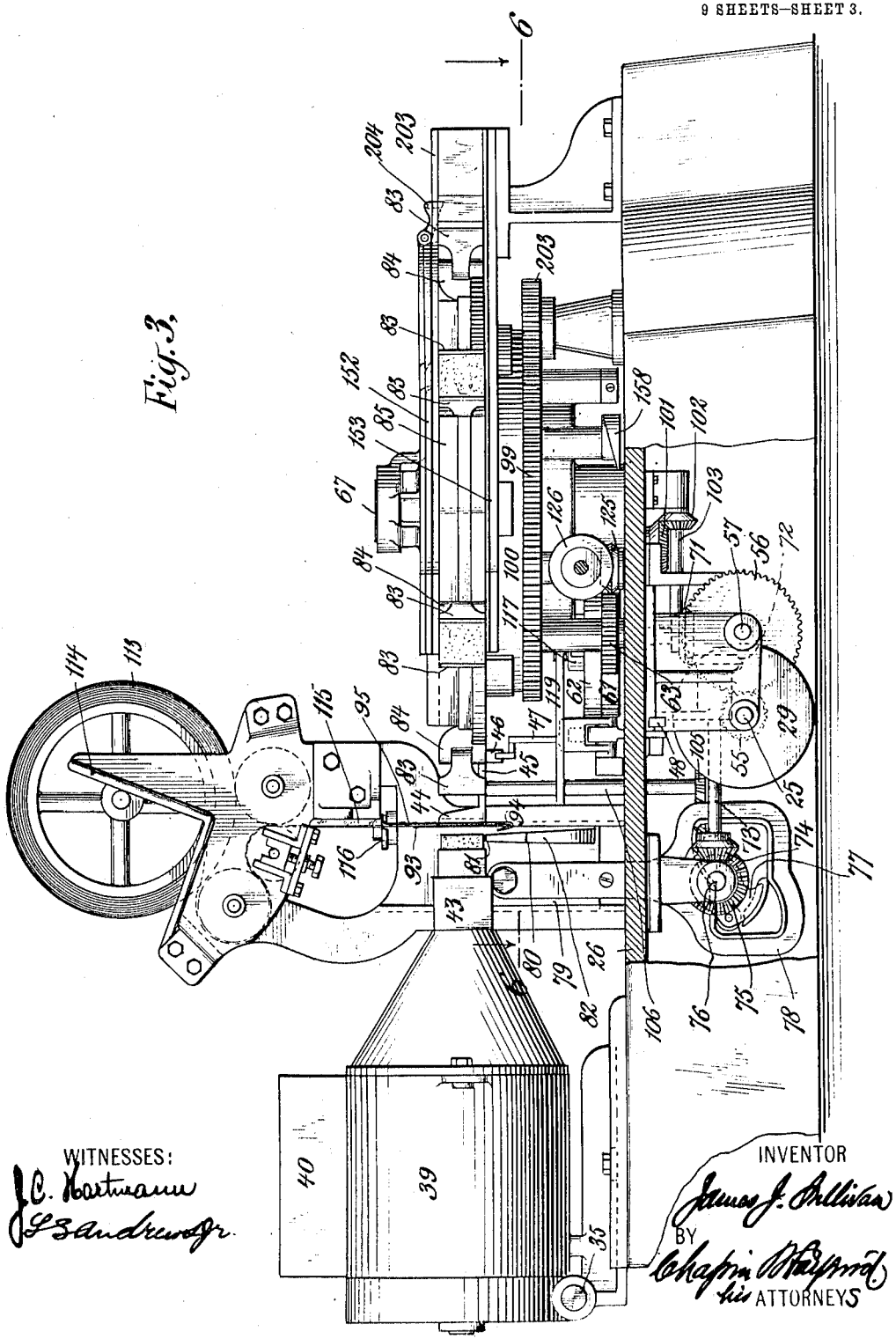

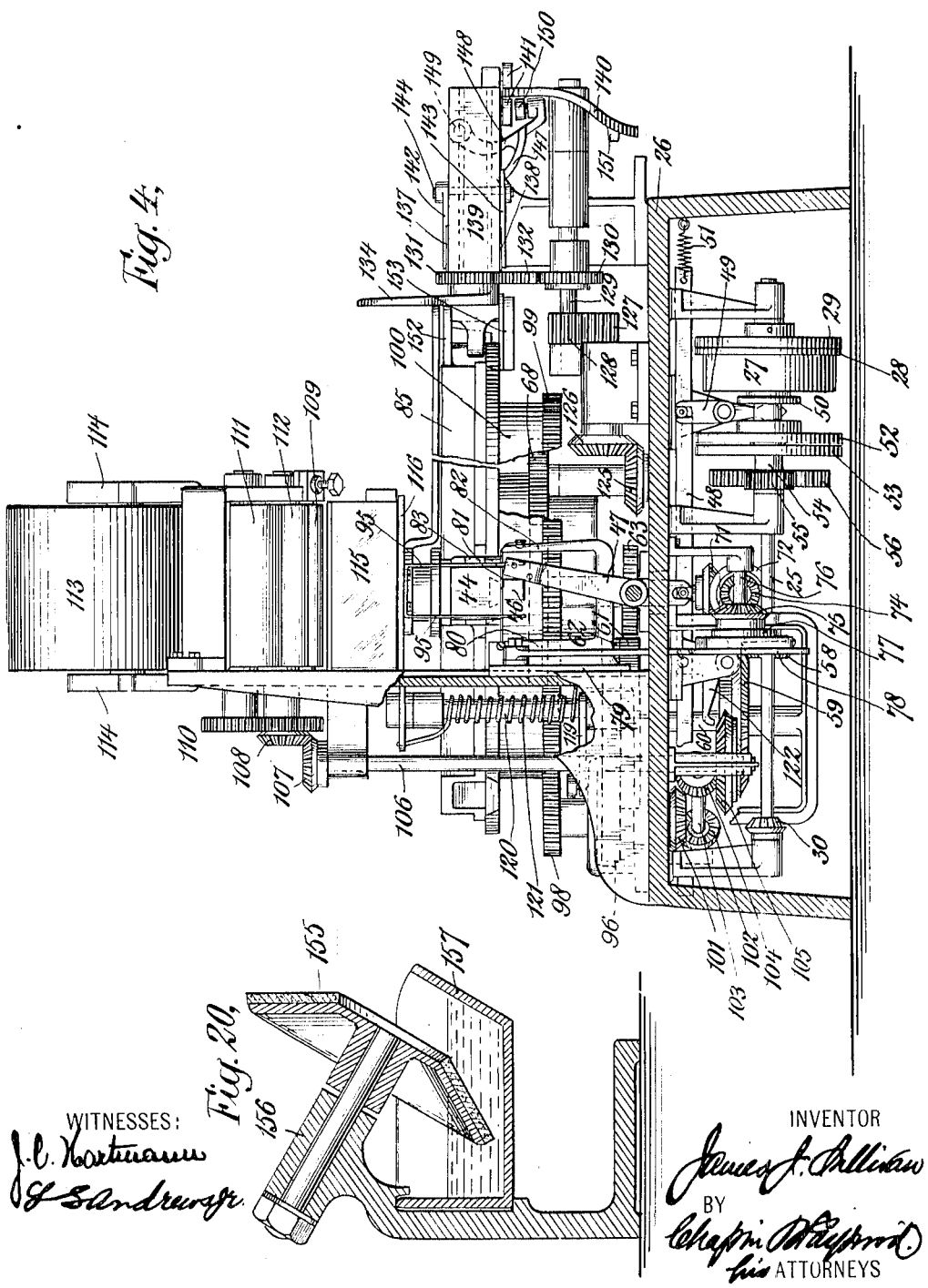

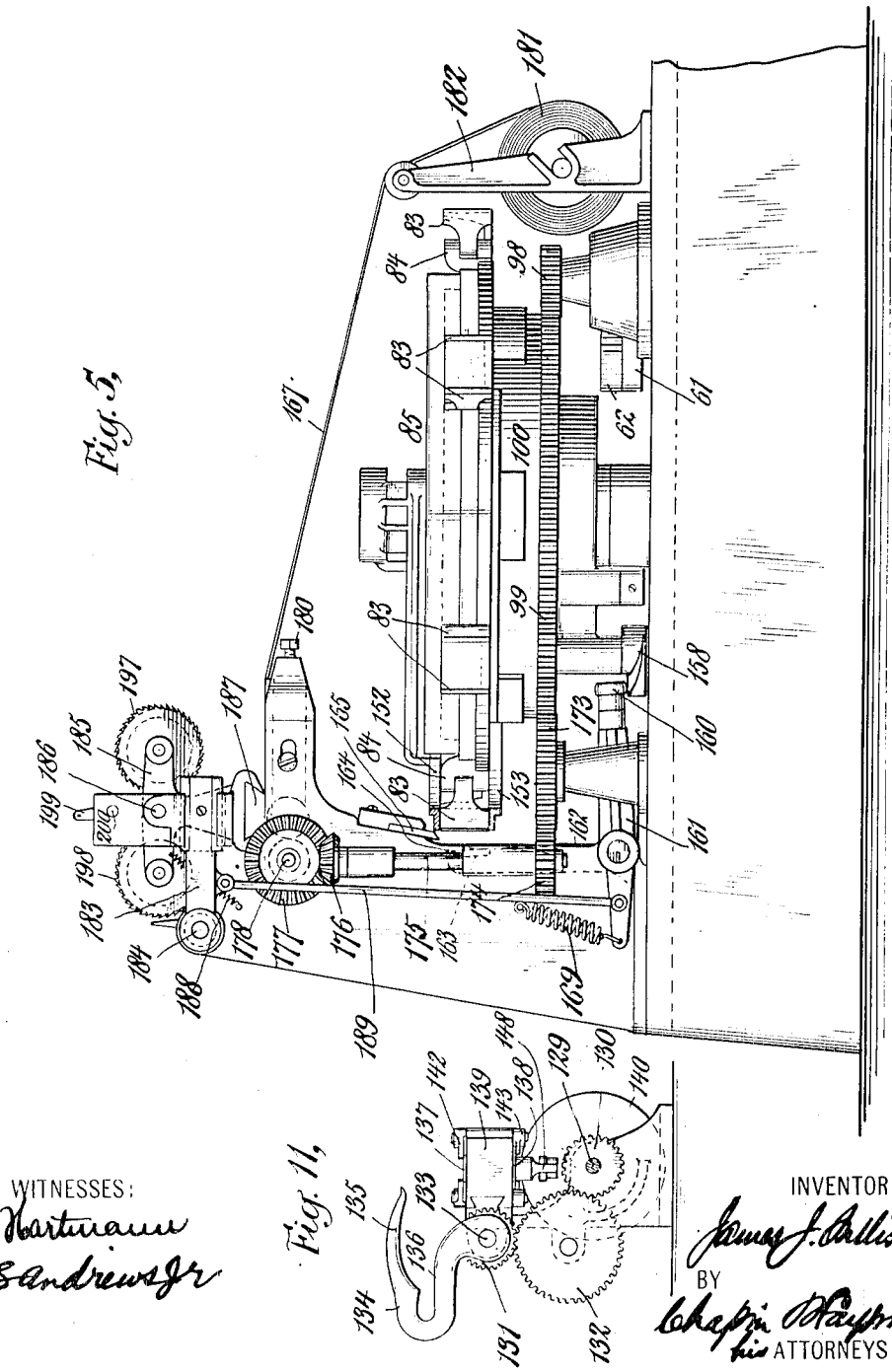

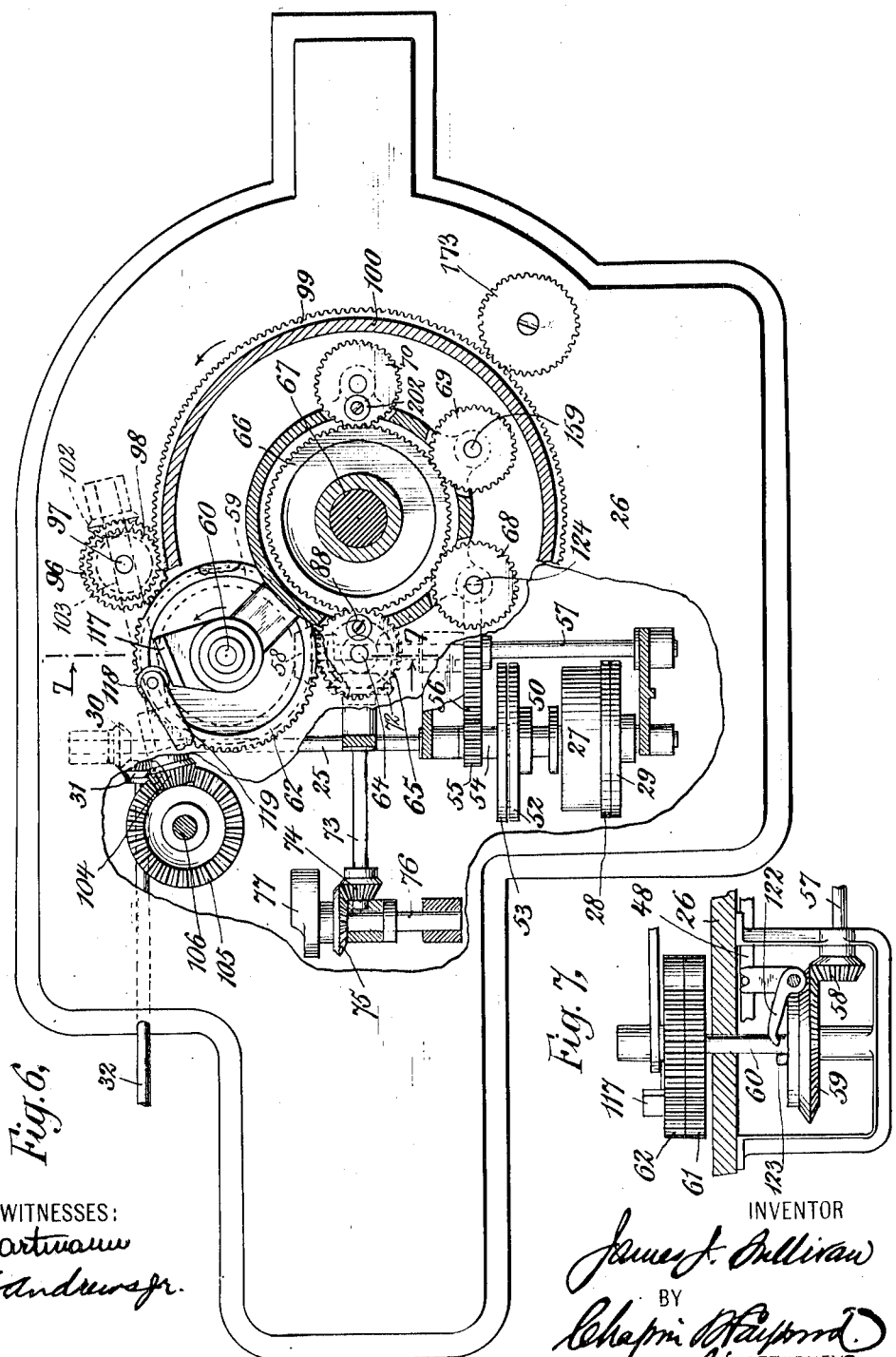

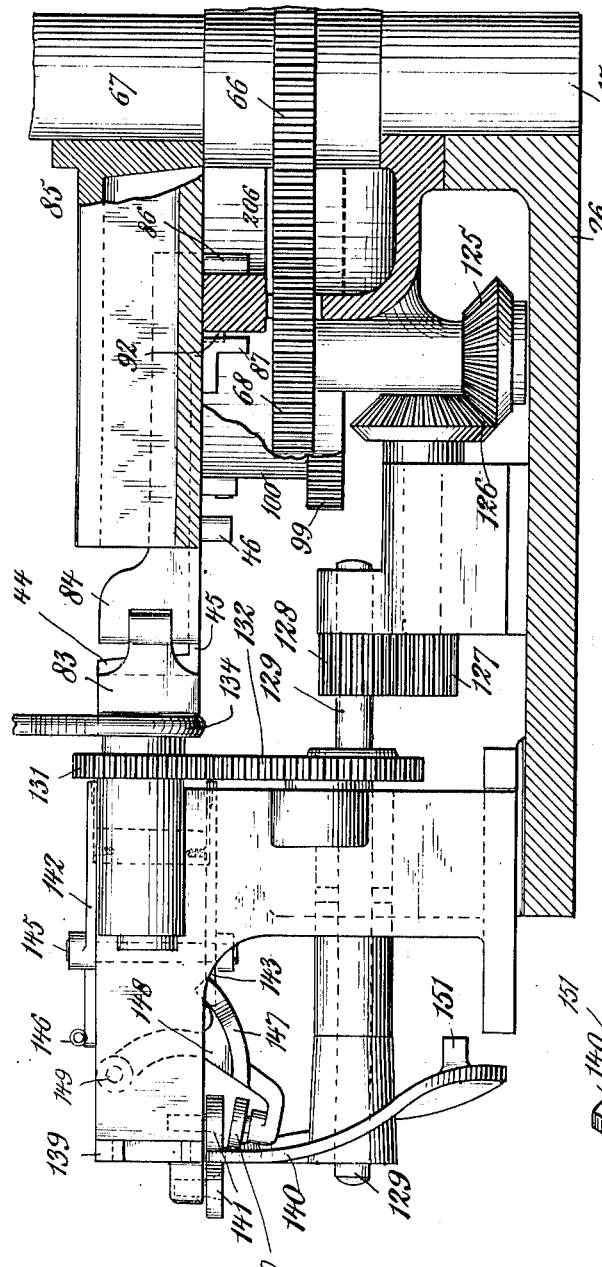

J. J. SULLIVAN.
WRAPPING MACHINE.
APPLICATION FILED MAR. 24, 1909.
1,001,179.
Patented Aug. 22, 1911.
9 SHEETS—SHEET 8.
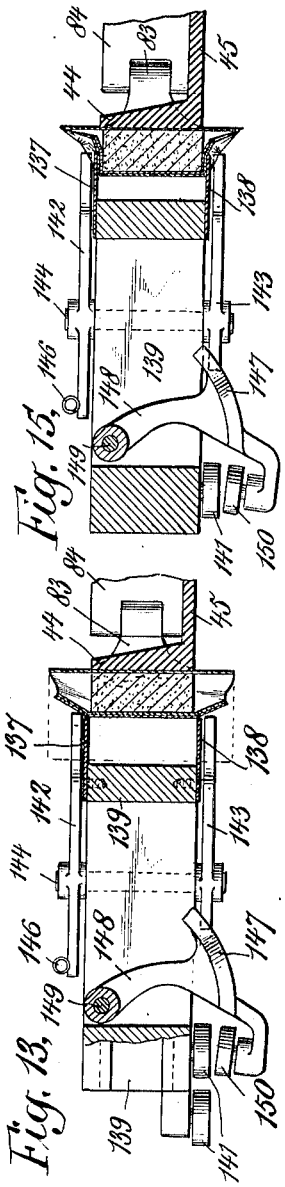
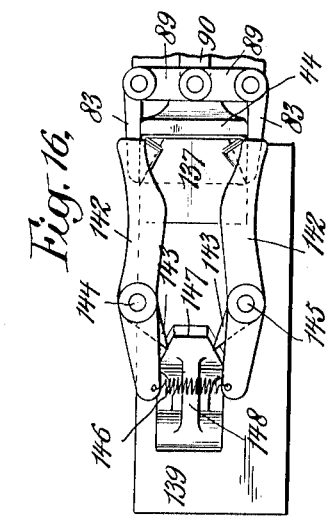
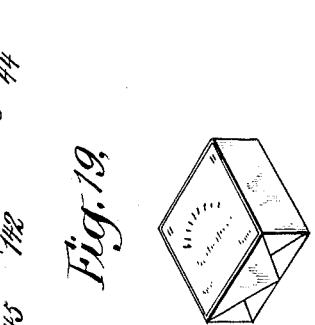
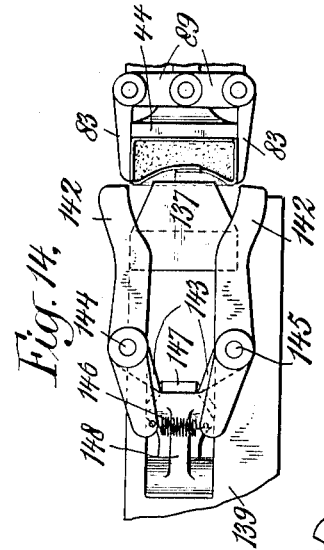
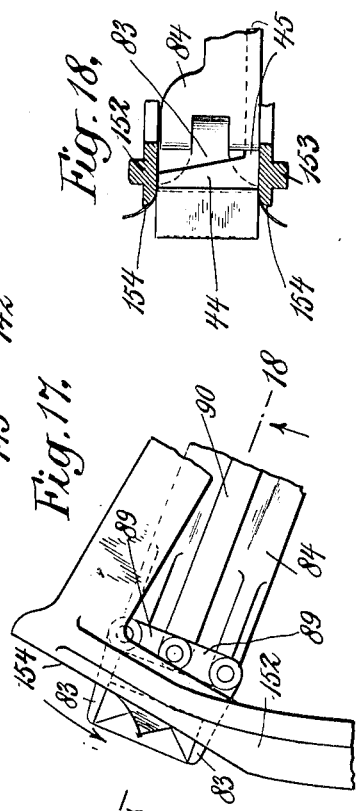
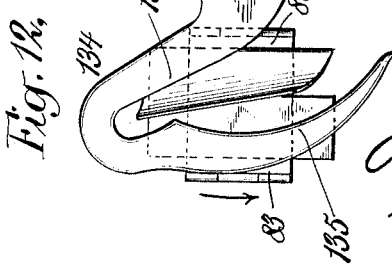
WITNESSES:
INVENTOR
BY
his ATTORNEYS

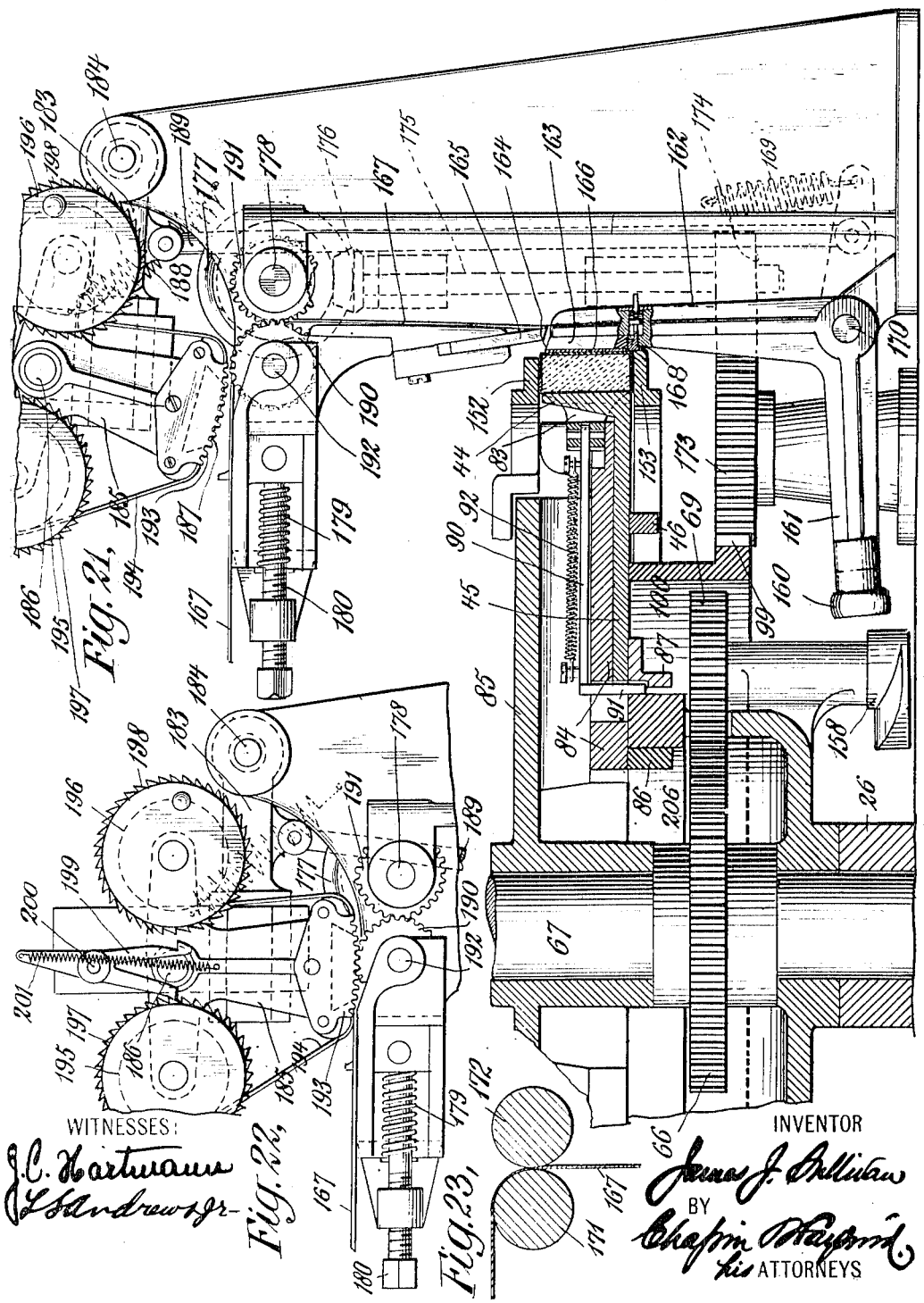

UNITED STATES PATENT OFFICE.

JAMES J. SULLIVAN, OF ELMHURST, NEW YORK.

WRAPPING-MACHINE.

1,001,179. Specification of Letters Patent. Patented Aug. 22, 1911.

Application filed March 24, 1909. Serial No. 485,492.

*To all whom it may concern:*

Be it known that I, JAMES J. SULLIVAN, a citizen of the United States of America, and a resident of Elmhurst, county of Queens, and State of New York, have invented certain new and useful Improvements in Wrapping-Machines, of which the following is a specification, reference being had to the accompanying drawings, forming a part thereof.

My invention relates to machines for automatically wrapping articles with a suitable wrapping material such as tin foil, and for preparing labels and applying them thereto.

The articles to be wrapped preferably comprise a predetermined quantity of plastic material such as yeast, which is automatically fed in a continuous bar to the machine and cut off into suitable lengths to form units or cakes, though it will, of course, be understood that the wrapping mechanism is equally applicable to wrapping other articles.

The main objects of my invention are to improve and simplify mechanism of this character, to so provide that all the movements throughout the machine shall be positive and entirely automatic, to provide that the movements of the various parts shall be as small as possible so as to permit of a high speed of operation, and particularly to provide a machine adapted to handle plastic material delivered therein in bulk.

In order that my invention may be fully understood, I will now proceed to describe in detail an embodiment thereof, such as is illustrated in the accompanying drawings, and will then point out the novel features in claims.

In the drawings: Figure 1 is a top view of the machine. Fig. 2 is a view in central longitudinal section therethrough, the plane of section being indicated by the line 2—2 of Fig. 1. Fig. 3 is a view in side elevation of the machine with the bed plate broken away substantially upon the line 3—3 of Fig. 1. Fig. 4 is a view in vertical transverse section upon the plane of the line 4—4 of Fig. 1. Fig. 5 is a view in oblique elevation of the machine, the point of view being taken upon the plane of the line 5—5 of Fig. 1 and in the direction of the arrows in proximity thereto. Fig. 6 is a view in horizontal section upon the plane of the line 6—6 of Fig. 2 and with portions of the bed plate broken away beneath the plane of section. Fig. 7 is a detail view of certain of the operating parts, the plane of section being upon the line 7—7 of Fig. 6. Fig. 8 is a detail under side view in horizontal section upon the plane of the line 8—8 of Fig. 2. Fig. 9 is a detail view in vertical section upon the plane of the line 9—9 of Fig. 1. Fig. 10 is a detail top view of certain parts of the folder mechanism shown in Fig. 9. Fig. 11 is an end view of the parts shown in Figs. 9 and 10, and particularly illustrating the folding blade which operates to complete the side folds of the wrapper. Fig. 12 is a detail view showing the folding blade in the act of completing the said side folds. Fig. 13 is a detail view in longitudinal section of the means for producing the end folds of the wrapper, the parts being shown as just commencing their folding operation. Fig. 14 is a top view of the parts in the same position. Figs. 15 and 16 are views similar to Figs. 13 and 14, showing the parts as in the act of completing their folding operation. Fig. 17 is a detail top view of the means for completing the end folds by turning down the projecting lip left by the mechanism illustrated in Figs. 12 to 15. Fig. 18 is a detail sectional view upon the line 18—18 of Fig. 17. Fig. 19 is a view in perspective of the completely wrapped article to which, however, in addition to the folded wrapper, a label has been applied. Fig. 20 is a detail sectional view of the damping roller, the plane of section being indicated by the line 20—20 of Fig. 1. Fig. 21 is a detail sectional view upon the line 21—21 of Fig. 1, showing particularly the printing mechanism and means for applying a label. Fig. 22 is a view in side elevation of the printing mechanism shown in the upper part of Fig. 21, showing the printing mechanism as in the act of making an impression. Fig. 23 is a detail sectional view transversely through the feed rolls for the label strip.

A cycle of operation in the present machine may be divided, first, into two parts,—one in which material which is to be segregated, inclosed in a wrapper, and labeled, is being fed to the machine, and the other in which the various operations of segregating the material, wrapping it, labeling it, and delivering it, are carried out. During the time the feeding mechanism is in operation the rest of the mechanism is at rest, while during the time the other mechanism is operating the feeding means is at rest.

The mechanism for driving the parts is as follows: The drive shaft 25 is located beneath the bed plate 26 of the machine being journaled in suitable bearings secured to the said bed plate, and is provided with a suitable pulley 27 by which it may be driven. The said pulley is, however, mounted loosely upon the shaft, but is adapted to be connected in driving relation therewith by means of a clutch member 28 which is secured to the said pulley and a complementary clutch member 29 arranged fast upon the shaft 25. At the opposite end of the shaft to that at which the pulley 27 and clutch members 28 and 29 are located, the said shaft is also provided with a miter gear 30 which is arranged in mesh with a corresponding miter gear 31 upon a shaft 32 which extends rearwardly in a direction longitudinal of the machine. At its rear end the said shaft 32 is provided with a miter gear 33 which is arranged in mesh with a corresponding miter gear 34 upon a transverse shaft 35; the said shaft 35 carries a worm 36 which engages the teeth of a worm wheel 37 secured upon the feed shaft 38 of the feeding mechanism 39.

The feeding mechanism comprises a suitable receiving hopper 40 for the reception of material to be wrapped, which in the present case may be a plastic material such as yeast, stirring blades 41 for acting upon the mass to thoroughly mix the same, a feed screw 42 for feeding the material forward, and a discharge nozzle 43 through which the material is adapted to be fed toward the wrapping mechanism. The stirring blades 41 and the feed screw 42 are mounted upon the said shaft 38 and are rotated by the driving mechanism just described in a direction to feed the material toward and through the nozzle 43. The feed of the material continues for so long a time as the drive shaft is connected in operative driving relation therewith through the clutch members 28 and 29, but will cease immediately the said clutch members are disengaged. This disengagement is brought about automatically by means of the material which has been discharged through the nozzle 43 when a predetermined quantity of the material has been so discharged, and is effected in the following manner: A finger 44 is disposed in the path of the material as it is being fed through the nozzle (see particularly Figs. 2 and 3), the said finger being arranged upon a plate 45, at the under side of which is an abutment 46. The said abutment is, during the time of the feeding of the material, in the path of transverse movement of a pivoted shipper lever 47, the lower end of which engages a shipping bar 48. The shipper bar is arranged in engagement with a pivoted clutch operating lever 49, the lower end of which engages a collar 50 which is secured to the drive pulley 27. The drive pulley 27, which, as has already been stated, is mounted to rotate loosely upon the shaft 25, is permitted a slight longitudinal play upon the said shaft and a spring 51 normally exerts tension to pull the shipper bar 48 in a direction to move the pulley 27 toward the left (as viewed in Fig. 4) to disengage the clutch member 28 from the clutch member 29. When, therefore, the abutment 46 is moved by the engagement of the material as it is being fed forward in the machine so as to clear the shipping lever 47, the said shipping lever will be permitted to swing over to the left (as viewed in Fig. 4) permitting the bar 48 to move over to the right and the pulley 27 and clutch member 28 over to the left. All feeding movements will now immediately cease, but the foregoing movement, in addition to disengaging the clutch members 28 and 29 will have the effect of engaging other clutch mechanism so as to thereafter immediately commence to drive the other parts of the machine. The other said clutch mechanism comprises a clutch member 52 which is secured fast with the collar 50 and drive pulley 27 and a complementary clutch member 53 which is secured to a sleeve 54 mounted loosely upon the shaft 25. The said sleeve 54 also carries a pinion 55 which is secured rigidly thereon, the said pinion being arranged in mesh with a spur gear 56 which is carried by an intermediate shaft 57 mounted in suitable bearings beneath the bed plate of the machine parallel with the drive shaft 25. The intermediate shaft 57 is provided at one end thereof with a bevel pinion 58, the teeth of which are arranged in mesh with a bevel spur gear 59 disposed upon a vertical shaft 60. The vertical shaft 60 passes through the bed plate 26 to a point above the said bed plate and is provided with two mutilated gear wheels 61—62. The lower of the mutilated gear wheels 61 is arranged to engage a pinion 63 which is mounted fast upon a vertical shaft 64 in the central line of the machine. The shaft 64 is also provided at its upper end with a pinion 65, the said pinion being arranged in mesh with a spur gear 66 mounted loosely upon the central post 67 of the machine. The spur gear 66 is also arranged in mesh with certain other pinions 68—69—70 which are disposed concentrically around the central post 67 as will be seen by reference to Fig. 6, whereby the movement imparted to the shaft 64 and pinion 65 will be partaken of by the said pinions 68—69—70.

At its lower end the shaft 64 is provided with a bevel gear 71 which is arranged in mesh with a complementary bevel gear 72 secured upon a short shaft 73 which is journaled in suitable bearings beneath the bed plate 26 of the machine and which is disposed longitudinally in the central line of the machine. At its rear end the said shaft 73 is provided with a bevel gear 74 which is disposed in mesh with a complementary bevel gear 75 secured upon a short transverse shaft 76. The said shaft 76 is provided with a cam 77 which is housed in a yoke 78, the said yoke being connected to a cross-head 79 which carries a cutter 80 for cutting off a predetermined quantity of the material which has been fed through the nozzle 43. The cutter 80 may be of different characters in accordance with the character of material to be acted upon; where a plastic material such as yeast is employed, such cutter preferably comprises a short section of wire 81 (see Fig. 4) held taut in a position to engage the material when the cross head is moved in either direction by means of a yoke 82. Normally the cutter (in this case the wire 81), is held at rest just below or above the path of movement of the material as it is being fed from the nozzle 43, but directly the feeding ceases by reason of the tripping of the clutch mechanism by the material itself as has been explained above, and the train of gearing through the pinion 55, spur gear 56, shaft 57, bevel pinion 58, bevel spur 59, vertical shaft 60, and mutilated gear 61 has been set in motion, the said mutilated gear will promptly engage the pinion 63 so as to rotate the vertical shaft 64 and thereafter through the train of gearing including the bevel gears 71 and 72, shaft 73, and bevel gears 74 and 75, rotate the shaft 76 and with it the cam 77 whereby to impart a rapid movement to the cross head 79 through the medium of the yoke 78 so as to cause the cutter to move in one direction or the other across the body of the material in front of the nozzle (see Fig. 3), and thereby to cut off the front portion of the material so as to segregate the same, and to present such portion in the form of a rectangular unit or cake, as it is called, to the receiving and wrapping mechanism to be wrapped, labeled, and delivered.

I will now describe the means for receiving the segregated unit or cake of material and the means for operating the same, such means deriving its actuation from the shaft 64 at the same time as the cutter is operated for so segregating the cake as has just been described, but it must be understood that prior to this time a section of wrapping material has been fed down to a position in advance of the plastic material and at this time lies between the front face of the material and the contiguous face of the finger 44 (see Figs. 2 and 3). As will presently be seen the operation of feeding, cutting off, and positioning this section of wrapping material took place during a previous cycle of the machine, and it will be later explained in its logical order, as to when it is again accomplished in the present cycle of operation, for employment in a subsequent cycle. The receiving means for the segregated cake comprises two fingers 83 which are pivotally mounted upon a slide 84. The said slide 84 is radially mounted in a turn table 85 which is mounted to rotate freely upon the central post 67. It may be here noted that there are a plurality of these slides with their appurtenances, mounted in the said turn table, six being shown in the present instance, and that a step by step movement is given to the turn table to bring each of these slides in order, in line with the material being fed. As all of these slides and their appurtenances are precisely similar, a description of one will serve for all, but it will be understood that the particular slide referred to in the following description is the one which is now in line with the hopper nozzle. The said slide is mounted in a suitable guideway so that it may be freely moved radially in the said turn table. At its lower face the said slide is provided with two dependent flanges 86—87, the contiguous faces of the said flanges being spaced apart so as to receive a stud 88 with which the pinion 65 is provided. The said fingers 83 are provided with short arms 89 by which they may be operated, the said arms being pivotally connected to an operating rod 90 which extends longitudinally along the front face of the slide, and the said operating rod is provided with a dependent finger 91 which passes down through a suitable opening in the said slide 84 to a position between the stud 88 and the face of the flange 87. A spring 92 normally operates to pull upon the said operating rod 90 in a direction toward the central post 67 so as to swing the fingers 83 in a direction toward each other. The normal rest position of these parts is with the slide retracted to its inner position toward the center of rotation of the turn table and with the operating rod 90 retracted so as to cause the fingers 83 to be moved toward each other. The parts are so shown in Figs. 2 and 3 of the drawings and are in such position while the material is being fed forward and preferably up to the time such feeding movement ceases.

Immediately the shaft 64 commences to rotate in the manner aforesaid to accomplish the cutting off of the material the gear wheel 65, rotating therewith, carries the stud 88 around in a course concentric with its center of rotation and the said stud in its movement operates to move the slide 84 forward in a direction toward the hopper nozzle 43. At the moment of its first movement it will engage the dependent finger 91 of the operating bar 90 thereby operating to move the fingers 83 apart so that as the slide moves forward the fingers 83 will be slightly spread. The movement of the slide will be sufficient to carry the fingers to a position upon either side of the portion of the material which is being segregated and the first movement of the stud 88 as it passes the central line of the machine upon its return movement will release the operating rod thereby permitting the spring 92 to retract the same and to cause the fingers to move together to embrace and hold the said material. At just about this moment the section of material will have been entirely segregated so that upon the return movement of the slide the segregated cake will be drawn back as the slide moves back to its first position. The mutilated gear 61 is so proportioned with relation to the pinion 63 with which it engages to rotate the shaft 64, as to impart exactly one revolution to the said shaft 64 at each operation so that the aforesaid driving movements will effect one complete reciprocating movement of the slide, the first half or forward portion of such movementt being synchronous with an operative movement of the cutter 80. It will be noted that the cam 77 has a dwell portion, so that it is active for only the first half of the movement imparted to it during each cycle of operation of the machine.

The plate 45 which carries the finger 44 is mounted in a guide-way in the slide 84 and there is enough frictional hold between them to cause the two said parts to move together unless the one or the other is operated independently. It will be remembered that the material, in moving forward through the nozzle 43, engages the finger 44 to thereby cause the plate 45 to move toward the central post 67. This is a movement relatively to the slide but the slide is held against movement at the time by the stud 88. When the forward feed of the material ceases, further movement of the finger 44 and plate 45 ceases, and thereafter when the movement of the stud 88 compels the forward movement of the slide 84 such movement is again a relative one with respect to the finger 44 and slide 45, and the extent of such movement is sufficient to bring the fingers 83 in front of the finger 44 so that while the fingers 83 embrace the sides of the material the face of the finger is, except for the section of wrapping material above referred to, in engagement with the forward face of the material, and when the stud 88 upon its return movement retracts the slide, the plate 45 and finger 44 will be retracted therewith. The relative positions of the finger 44, plate 45, fingers 83, and slide 84 at this time are clearly shown in Figs. 5, 9, 13, 14, 15 and 16. Remembering that a section of wrapping material lies in front of the advancing material as is shown at 93 in Fig. 3, it will follow that the forward movement of the material will carry back with it this section of wrapping material. This section of wrapping material preferably rests upon a suitable support 94, and side guides 95, composed conveniently of wire strips bent portions of which may constitute the said support 94, being located upon either side of the path of movement of the material, the distance between them being just greater than the width of the advancing material, such forward movement will have the tendency to bend the sides of the wrapping material around the side edges of the plastic material to be wrapped so that the wrapping material will assume substantially a trough-shape. The relative movement between the slide 84 and the finger 44 by which the fingers 83 are projected beyond the face of the finger 44 will complete this bending operation of the wrapping material or will effect it if the side guides 95 be omitted and the wrapping material will thereby be pressed close to the sides of the segregated cake of plastic material so that when the said segregated cake is carried back by the slide the wrapping material in its trough-like form will be carried back therewith, the side edges of the wrapping material projecting at right angles to the most recently cut face of the said cake. The cake with its section of wrapping material so disposed is now ready to be transferred to another position in the machine to be operated upon by wrapping and other mechanism, as will be presently explained. This transfer is brought about by a step by step movement of the turn table 85, the extent of such movement being, in the present instance, one-sixth of a revolution at a time. The turn table is so moved by means of the mutilated gear 62 which engages at the proper time a pinion 96, the said pinion being secured upon a vertical shaft 97 which also carries a pinion 98, the teeth of which are disposed in mesh with teeth 99 upon an apron 100 which is dependent from, and secured to, the said turn table 85.

The relationship of the teeth of the mutilated gear wheel 62 with the teeth of the pinions 96—97 and the teeth 99 of the turn table 85, is such that a portion of the said mutilated gear wheel will produce just exactly one-sixth of a revolution of the said turn table and the time at which the teeth of the mutilated gear wheel 62 engages the pinion 96 is after, and preferably immediately after, the mutilated gear wheel 61 has completed its engagement with the pinion 63, wherein the vertical shaft 64 has made one full revolution. Directly the turn table has completed its one-sixth of a movement so as to bring a new slide into line with the hopper nozzle it is necessary to shift the drive from its connection through the clutch members 52 and 53 with the mechanism last described, to its connection through the clutch members 28 and 29 with the feeding mechanism. This is accomplished by the abutment 46 of the plate 45, which in the last portion of the movement of the turn table comes into engagement with the shipping lever 47, as will be readily understood by reference to Figs. 3 and 4 of the drawings, so as to move the said lever 47 back to the position in which it is shown in Fig. 4, thereby shifting the shipper rod 48 over to the left, as is viewed in Fig. 4, against the tension of the spring 51 and rocking the lever 49 upon its pivotal support so as to slide the elements 50—52 and 28 upon the shaft 25 whereby to disengage the clutch member 52 from the clutch member 53 and to cause the clutch member 28 to engage the clutch member 29. In order to positively stop the movement of the turn table at the right moment and to prevent overrunning thereof due to the momentum of the moving parts, I have provided a pawl 122, the end of which is adapted to engage a shouldered portion 123 provided at the rear of the bevel wheel 59 upon the vertical mutilated gear shaft 60, said pawl being drawn out of engagement with the said shoulder when the shipper rod is moved to a position to cause the turn table to be driven, and permitted to engage the said abutment when the shipper rod is moved in the opposite direction.

The feeding mechanism for the wrapping material is operated during the time of making the aforementioned transfer, the said mechanism being operated through a train of gearing connected with the shaft 97. The said shaft 97 is provided at its lower end with a bevel gear 101, the teeth of which are arranged in mesh with a complementary bevel gear 102. The bevel gear 102 is secured upon a horizontal shaft 103, the said shaft being also provided with a bevel gear 104, the teeth of which are disposed in mesh with the teeth of a bevel gear wheel 105 which is mounted securely upon a vertical shaft 106. At its upper end the said vertical shaft is provided with a miter gear 107, the teeth of which are disposed in mesh with a corresponding miter gear 108, the latter said gear being mounted upon the shaft of a feed roller 109. The feed roller 109 is connected by suitable gearing 110 with a similar feed roller 111 and with an intermediate feed roller 112. The roll of wrapping material 113 which may conveniently be tin foil, is supported circumferentially upon the feed rollers 109—111, the axle of the said roll conveniently resting against the face of brackets 114 with which the machine is provided. The wrapping material passes from the periphery of the roll 113 around the feed roller 111, over the intermediate roller 112, and down between the said intermediate feed roller 112 and the feed roller 109. Thence said material passes along the face of a stationary cutting knife 115 and between the same and a movable cutting knife 116, down in front of the finger 44, as will be readily understood by reference to Figs. 1 and 2 of the drawings. The train of gearing just described will cause the feed rollers 109 and 111 to be rotated when the shaft 97 is rotated, this shaft 97 rotating as has just been explained, for the purpose of also effecting the transfer movement of the turn table. The extent of movement of the rollers will be just sufficient to feed an amount of wrapping material required for wrapping a segregated cake of the plastic material.

Just at the completion of the feeding movement a cam piece 117, which is carried by the mutilated gear shaft 60 will engage the cam follower 118 which is carried by an arm 119 secured to a rock shaft 120 upon which the said movable cutter 116 is mounted. This rock shaft is provided with a spring 121 for the purpose of holding the cam follower against the face of the cam and returning the cutter to its normal position after it has been operated by the said cam. The cam piece 117 is so positioned upon the mutilated gear shaft that it will operate to cut off a section of the wrapping material just at the completion of the feed thereof and hence just as the turn table comes to rest. The piece of wrapping material so separated from the strip will then fall down across the path of movement of the material as it comes from the hopper nozzle ready for the next unit of material to be wrapped, and to a position where it will be supported by the support 94.

So far as the timing of the machine is concerned, the foregoing is a description of a complete cycle thereof, but it is, of course, understood that many other operations, which have not so far been described, take place during such cycle, such operations including the folding of the sides and ends of the wrapper, the placing of a label thereon, the delivery of the finished article, and the resetting of certain parts. These various operations take place at different points in the machine during the before mentioned time in which the driving is being carried on through the clutch members 52 and 53 and hence during the time of the cutting off and receiving of the segregated cake at one point in the machine and the step by step movement of the turn table from one point to another. As has been before pointed out, the turn table carries a plurality of receiving slides,—six in the present instance,—all of which are precisely alike. While therefore a cake is being cut off and received by one of the said slides another cake previously received by the preceding slide is free to be operated upon at another point in the machine and further operations can be simultaneously carried out upon cakes which have similarly been received at further preceding times. In the present machine I operate upon four cakes simultaneously at four different points in the machine while the turn table is at rest, and as will presently appear I carry out certain other operations during the movement of the turn table. I operate upon the cake at a point one-sixth of a revolution in advance of the position in line with the hopper nozzle, to complete the side folds and to make the end folds up to, but not including, the turning over of the projecting folded ends. This latter point I term the "second position" in the machine, while the position in line with the hopper nozzle I term the "first position." I then fold over these projecting folded ends during the time the article is moved from the second to the third position in the machine, the latter position being two-sixths of a revolution in advance of the position in front of the feed nozzle, and during the movement between the second and third positions I also apply moisture to the rear face of the wrapped article so that it will be ready to receive a gummed label at the third position. At the third position I apply the said gummed label and I also provide mechanism at this point for printing the label and separating individual labels from a strip of label material. At the fourth position, which is one-half of a revolution in advance of the position in front of the feed nozzle and is therefore exactly in line with the feed nozzle but upon an opposite side of the center of the axis of rotation of the turn table, I discharge the completely wrapped and labeled article from the receiving slide into a receiving chute. At some time after leaving the fourth position I operate upon the finger plate 45 so as to adjust it to a proper position for presentation to the feed nozzle. The mechanisms at the second, third, and fourth positions are operated by means of the pinions 68—69—70 respectively which, it will be remembered, rotate synchronously with the rotation of the pinion 65 upon the vertical shaft 64 owing to their connection therewith through the spur gear 66. It will be understood therefore that though it is necessary in the present specification to describe separately the various operations which are carried on at the second, third, and fourth positions, such operations are being carried on simultaneously with the operation carried out upon the rotation of the shaft 64 at the first position.

I will now proceed to describe the operation carried out at the second position which includes the folding over of the projecting side portions of the wrapper and the forming of the end folds, and for an understanding of this mechanism I refer particularly to the views illustrated in Figs. 1, 4, 9, 10, 11, 12, 13, 14, 15, and 16. The pinion 68 is mounted upon a short vertical shaft 124 and is provided at its lower end with a miter gear 125. This miter gear is arranged in mesh with the teeth of a complementary miter gear 126 which is mounted upon one end of a short horizontally arranged shaft, the opposite end of which carries a pinion 127; said pinion is disposed in mesh with a corresponding pinion 128 mounted upon a cam shaft 129, the said shaft having also secured thereto a pinion 130; the pinion 130 is arranged in driving relation with a pinion 131 through an idler gear 132; the pinion 131 is secured upon a short horizontal shaft 133 to which is also secured a folding blade 134 (see particularly Figs. 1, 9, 10, and 11).

The relationship of the gearing just described is such that a single revolution of the pinion 68 produces one full revolution of the folder blade 134. The folding blade 134 is arranged immediately adjacent the receiving slide of the turn table at the second position and in its rotation the said slide is arranged to rotate across the face of a cake as it is held by the said slide at the said second position. It will be remembered that the article, when presented at this position, has the wrapper partially around it in trough-like form, the sides projecting at right angles from the face thereof. As this folding blade passes over the face of the cake the arm or member 135 thereof will first engage one of the projecting sides of the wrapper to fold the same down upon the face of the cake, as is clearly shown in Fig. 12 of the drawings, and thereafter the other arm or member 136 will engage the other side to also fold the said other side down upon the face of the cake, as will also be readily understood by reference to Fig. 12. The said folding blade in passing on will smooth down the wrapping material upon the face of the cake so as to properly complete the fold and leave a good finish. The wrapper is now in tubular form around the article and is ready to have the end portions tucked in and folded over. The front end tucks are produced by two plates 137—138 which are secured to, and carried by, a reciprocating block 139. (See particularly Figs. 1, 9, 10, 13, 14, 15, and 16). The reciprocation of the block 139 is brought about by means of a cam 140 which is mounted upon the cam shaft 129, the cam 140 engaging two cam followers 141 secured to the said block 139 (see Fig. 9). The relation of the parts is such that just as the folder blade 134 completes its folding operation the plates 137—138 will have arrived at a position to engage the projecting front ends of the tube-like wrapper, and upon a further forward movement will tuck in the said ends.

The block and plates are shown in their rearmost position in Fig. 9, in their positions wherein the said plates are just commencing to tuck in the ends in Figs. 13 and 14, and in their extreme inner positions in Figs. 15 and 16 wherein they have completed the tucking in of the ends. Thereafter the action of the cam 140 will be to draw the parts back into the position shown in Fig. 9. While the block is in its forward position a further operation is, however, performed upon the projecting ends of the wrapper, namely, lateral folds from opposite sides of the projecting ends are formed, this operation being performed by two pairs of folder arms 142—143 carried by the said block 139, and pivotally connected at 144—145 to the said block 139. These two pairs of arms are arranged above and below the said block, the upper and lower arms being rigidly connected by the pivot pins 144—145, and the folding ends thereof are arranged to move immediately over and under the said plates 137—138. The upper set of arms are connected at their rear ends by means of a coil spring 146 while the lower arms are adapted to be engaged by a wedge-shaped member 147, upon an arm 148 which is pivotally connected at 149 with the said block 139. The arm 148 is provided with a cam follower 150 which is adapted to engage a cam projection 151 upon the side of the cam 140. Because of the fact that the arm 148 is carried at 149 by the block 139 the said arm will partake of the reciprocating movements of the said block, but in addition to such movements the arm 148 will be given an independent movement by the cam projection 151 at the time the block is in the forward portion of its stroke. The action of this cam projection upon the arm 148 will be to rock the same so as to force the wedge-shaped member 147 between the lower set of arms 142—143 so as to force the end folding portions thereof together over and under the cake to fold over the projecting side ends of the wrapper as will be readily understood by reference to Figs. 15 and 16 of the drawings. The cam projection 151 is so designed as to give a quick impulse to the folding arms, the said folding arms being then returned to their normal outer positions by means of the spring 146, the block 139 carrying the said arms, and the plates 137—138 being then returned to their normal rest position as shown in Fig. 9.

From the foregoing it will be seen that the operation of folding the sides of the wrapper across the face of the article, tucking in the front portion of the projecting ends, and the folding over of the side portions of the projecting ends is all effected while the article is held at the second position and during one revolution of the pinion 68, the revolution of which is synchronous with the revolution of the pinion 65 and shaft 64 so that the said operations will take place synchronously with the receiving of another cake at the No. 1 position of the machine.

The only operation to complete the wrapping that is now left to be accomplished is the folding down of the rear end flap, and this is accomplished during a step by step movement of the turn table. Intermediate the No. 2 and No. 3 positions are two stationary cheeks or folder plates 152—153 (see Figs. 1, 17, and 18), one being arranged immediately above and the other immediately below the path of movement of the wrapped article. The outer faces 154 of the said plates 152—153 are arranged at an angle to the circular movement of the article (see Fig. 17), the action of the said plates being thereby to wipe down the projecting flaps as the article is carried between them as will be well understood. When thereafter the article reaches the third position the entire wrapping operation will have been completed. In addition, however, to the operation of completing the fold intermediate the second and third positions there is a means also provided for applying moisture to the face of the wrapped article so that it will be ready to receive a gummed label at the third position. Such means consists in the present instance of a roller 155 mounted to rotate freely in a bearing 156, and a tank 157 for liquid. The roller is mounted at an angle to the horizontal, the lower portion of the said roller being immersed in the liquid in the said tank and the upper face of the said roller being adapted to engage the face of the wrapped article in its passage between the second and third positions. The face of the said roller may conveniently be formed of felt or some other absorbent and yielding material whereby it will readily pick up a sufficient quantity of liquid from the tank and will apply the same with a yielding pressure to the face of the wrapped article. The article so prepared is presented at the third position to receive a label, and I will now describe the means for preparing and applying the label. Referring more particularly to Figs. 5, 21, 22, and 23 in which the details of the mechanism more fully appear, the pinion 69 will be seen to carry with it a cam 158, the said cam being secured to a short vertical shaft 159 to which the said pinion 69 is also secured. This cam engages a cam follower 160 upon one arm 161 of a bell crank lever, the other arm 162 of which carries a label applying blade 163, the upper edge 164 of which constitutes one part of a cutting device. The bell crank lever 161—162 is pivotally mounted at 170 upon a stationary portion of the machine and is provided with a spring 169 (see Fig. 5) for holding the cam follower 160 against the face of the cam 158. A yielding support 168 for a label 166 is provided at the lower face of the label supplying blade 163, said yielding support being adapted to support the label during the rocking movement of the bell crank lever from its initial retracted rest position to a position wherein the said label is applied to the face of the article. The said support 168 is permitted to yield in order that the projecting portion thereof shall not oppose the label applying movement of the bell crank lever. The said bell crank lever is shown in its forward rest position in Fig. 5, but in Fig. 21 the said bell crank lever is shown in its forward position as in the act of applying a label to a wrapped cake presented for such purpose, the pinion 69 being shown in its intermediate rotating position. The label is preferably gummed and as the article has been moistened by the moisture applying roller 155 the said label will be caused to immediately adhere and the bell crank lever may be promptly rocked upon its support away from the face of the article immediately the label has been applied.

The label may be conveniently fed down to the label applying device in the form of a strip 167 while the pinion 69 and cam 158 are at rest and the bell crank lever arm 162 is in its rearmost position. The upper edge 164 of the label applying blade 163 may conveniently constitute one member of a cutting off device, the other member comprising a stationary blade 165 mounted at a point thereabove. The strip 167 being fed downward between the complementary cutting edges of the cutter members 164—165 while the cutting member 164 is in its rearmost position as aforesaid, to a point wherein the lower end of the strip is in register with the yielding support 168, a forward movement of the label applying device will sever an individual label 166 from the strip as the arm 162 moves forward to apply the label. Remembering that the pinion 69 revolves at the same time that the pinion 65 and vertical shaft 64 revolves, it will then be apparent that a label will be cut off and applied to the face of a wrapped article at the third position while the aforesaid folding operations are being applied to another article at the second position and the before mentioned operation of receiving another article is being carried out at the first position. The pinion 69 makes one complete revolution.

The operation of feeding the label strip is carried out during a step by step movement of the turn table by means of a train of gearing which connects feed rollers 171—172 with the gear teeth 99 of the said turn table. This train of gearing comprises an idler gear 173, the teeth of which are in mesh with the gear teeth 99, a pinion 174 with which the teeth of said idler gear are also in mesh, the said pinion being mounted at the lower end of a vertical shaft 175, a bevel gear 176 secured to the upper end of the said vertical shaft 175, and a complementary bevel gear wheel 177 secured upon the shaft 178 of the feed roller 172. The feed roller 171 is pressed up against the feed roller 172 by means of a spring 179, a tension regulating screw 180 being employed to adjust the tension of the said spring 179. The two rollers 171—172 are, moreover, caused to rotate synchronously by means of a pair of gears 190—191 with which they are provided, the former being secured upon the shaft 192 of the feed roller 171 and the latter upon the shaft 178 of the feed roller 172. The strip of label material passes between the rollers 171—172 from a supply roll 181 which is suitably journaled in brackets 182 at the opposite side of the machine. The relationship of the train of gearing above referred to is such as to feed a supply of the label strip through the feed rolls 171—172 just sufficient to form an individual label 166, as will be well understood, and as this feed movement takes place while the label applying device is at rest and during the movement of the turn table from one position to another, a fresh portion of the label strip will always be ready for the next label applying operation when the turn table comes to rest.

The label strip may be supplied in the machine, already printed, but I have illustrated herein a printing means whereby the printing may be carried out in the machine during the feeding of the label strip. This printing mechanism comprises an arm 183 pivotally connected at 184 to the frame of the machine, a rocking frame 185 pivotally mounted at 186 upon the arm 183, and a printing or impression member 187. A spring 188 is connected at one end to the frame of the machine and at the other end to the rocking frame 185, the said spring tending to move the frame 185 to the position in which it is shown in Fig. 21 and operating to yieldingly oppose the movement thereof to the position in which it is shown in Figs. 5 and 22, while the rocking arm 183 is connected with the bell crank lever 161—162 by means of a connecting rod 189. The frame 185 is also provided with a gear segment 193, the teeth of which are normally arranged to register with the teeth of the gear wheel 190 upon the feed roller shaft 192. When the feed rollers 171—172 are rotated to feed the strip forward during the before mentioned transfer movement of the turn table the rotation of the gear wheel 190 will, because of its engagement with the teeth of the gear segment 193, rock the frame 185 upon its support 186. The surface of the printing part 187 is formed concentric of the axis of rotation of the said frame and the printing part being at this time against the face of the label strip a printing operation will be performed as the label strip is fed forward. The normal rest position of the parts is with the frame 185 tilted to the opposite position in which it is shown in Fig. 1 and also with the arm 183 moved downward so that the gear segment teeth 193 are in engagement with the teeth of the pinion 190. The arm 183 is moved up or down through its connecting link 189 with the bell crank lever, when the said bell crank lever is operated and this takes place as has been just explained, not during the time the transfer is made, but while the turn table is at rest and the pinion 69 is being rotated. When this action takes place the arm 183 will be immediately lifted whereby to release the gear segment 193 from engagement with the teeth of the gear wheel 190, and the tilted frame 185 thereby permitted to move over to the position in which it is shown in Fig. 21 under the influence of its spring 188. Thereafter upon the completion of the rotation of the pinion 69 the arm 183 is moved downward so as to reëngage the teeth of the gear segment 193 with the teeth of the pinion 190 ready for a fresh printing operation. The parts are shown in this position in Fig. 5 of the drawings, and in Fig. 22 the parts are shown with the arm 183 in its normal downward position but with the swinging frame in an intermediate position in the act of producing an impression upon the strip, the said strip being in the act of being fed forward at the time.

I have shown a convenient form of inking means for the printer comprising an ink ribbon 194, two rollers 195 and 196 which are adapted to act alternately as take-up and pay-off rollers respectively and a ratchet and pawl mechanism for operating them. The rollers 195 and 196 are provided with ratchets 197—198 respectively and a double pawl 199 is pivotally mounted at 200 upon a stationary portion of the frame. A spring 201 operates to apply a yielding pressure upon the pawl in whichever direction it may be set at the time. During the time the rocking frame 185 is moving in a direction to produce an impression upon the label strip 167 the pawl will be slipping over the teeth of the ratchet wheel with which it is in engagement at the time, but upon the return movement the pawl will engage a tooth and impart a slight take-up movement to the take-up roll connected with such ratchet. The pawl may be thrown from side to side as may be well understood, so as to engage either one or other of the ratchet wheels 197—198 so as to permit either of the rollers 195—196 to act as take-up rollers at will.

I will now describe the means by which the wrapped and labeled article is discharged at the fourth position in the machine, and Figs. 1, 2, 3, 5, 6, and 8 may be referred to for a clear understanding of this mechanism. The mechanism is operated by the pinion 70 (see Figs. 2, 6, and 8). This pinion which, as will be remembered rotates synchronously with the pinion 64, 68, and 69, is provided with a stud 202 which is arranged to engage the slide when it is at the fourth position in the same manner as the stud 88 engages the slide when it is at the first position. The slide in being brought to the fourth position receives the said stud 202 between the dependent flanges 86 and 87, and when the said pinion 70 is rotated the slide is given a reciprocating movement in a radial direction with respect to the turn table. A receiving chute 203 is arranged in a line with the slide at this point, such line being the central line of the machine, the inner bore of which being of a proper size and shape to receive a wrapped and labeled article. The slide in its reciprocation forces the article into the chute and at about the moment the article reaches its delivered position in the said chute a pawl 204 drops down slightly in the rear thereof so that as the slide is withdrawn the article will not be withdrawn at the same time. In delivery of a succession of articles, one after another previously delivered articles are pushed forward thereby to make room for the succeeding article. In its return movement the slide will bring back with it the plate 45 and finger 44 because of the frictional engagement therewith as has been heretofore described, but the desired position for the said finger and plate is a forward position when the slide is brought around to the first position. For the purpose of moving the said plate and finger forward I have provided a stationary cam piece 205 which is adapted to engage the abutment 46 upon the lower face of the said plate 45 after the plate and slide leave the fourth position and before they again reach the first position. It may be noted that the fifth and sixth positions are idle ones,—that is to say, no operation takes place upon the slides or their parts at such positions.

In order to prevent the slides from moving radially in any positions other than the first and fourth positions I have provided a stationary ring 206 (see particularly Fig. 8) which is received between the abutments 86 and 87 upon the slides in all positions except the first and fourth positions. In these positions the said stationary ring is cut away as is shown at 207 and 208, but while the slides are in these cut away portions they are positively held by the studs 88 and 202 so as to prevent other than the predetermined required movements thereof.

The following is then a summary of the cycle of operation: In the operation it will be seen that first a predetermined quantity of the plastic material will be forced through the nozzle and that during such time all the rest of the machine will be idle. This is advantageous because the plastic material is liable to vary in density and such variation causes the time for delivering a predetermined quantity to vary. The exact amount, however, is always delivered because the delivery of the required quantity controls the stopping of the feeding mechanism. When a predetermined quantity has been so discharged the feed is stopped and thereafter the other operations take place. The time for the other operations may be divided into two periods,—one during which the mutilated gear wheel 61 is in operative engagement with its pinion 63, and the other during the time which the mutilated gear wheel 62 is in operative engagement with its pinion 96. During the period the mutilated gear wheel is in operative connection with its pinion 63 a portion of the plastic material fed to the machine will be segregated to form a cake and the cake will be received by the slide at the first position, a section of the wrapping material being also carried with it and being bent into trough-like form. At the same time the various folding operations for completing the wrapping of the article up to the folding over of the rear end flap will be taking place upon another article at the second position and at the same time a labeling operation will be taking place at the third position upon another article, the printing mechanism being simultaneously tripped so as to set the printer in its position ready for a new printing operation and the inking mechanism operated; and at the same time another article will be discharged at the fourth position. During the second period above referred to, namely, when the mutilated gear wheel 62 is in operative engagement with its pinion 96, the turn table will be given a step by step movement of one-sixth of a revolution, the effect of which will be to transfer the slides forward one position, to fold over the end flaps which were left projecting at the second position, to apply moisture to the face of a wrapped article so that it will be ready to receive a gummed label, and to reset the finger 44 which has left the fourth position so that it will be ready for its work at the first position. During the same time a fresh supply of wrapping material will be fed down in front of the nozzle and cut off to form a new wrapper and a fresh supply of label strip will be fed to the labeling means and printed by the printing mechanism.

The feeding mechanism and the cross control between the operating means for the feeding mechanism and the operating mechanism for the other parts of the machine, are not claimed in the present application but are claimed in a separate copending application filed as a division of this application, the same being serially numbered 510,972 and filed August 3, 1909; and certain broad claims in connection with the feeding means are also contained in another copending application Serial Number 517,478 filed September 13, 1909, the same being the second renewal of an application Serial Number 386,598 filed August 8, 1907.

What I claim is:

1. The combination with a receiver for plastic material, and a discharge nozzle therefor, of expelling means for feeding the plastic material through the discharge nozzle, folding means for folding a wrapper around the material so fed forward, and means operated by the movement of the plastic material as it emerges from the nozzle for controlling the operation of the said folding means.

2. The combination with a receiver for plastic material, and a discharge nozzle therefor, of expelling means for feeding the plastic material to a carrier through the discharge nozzle, a carrier for receiving the same, folding means for folding a wrapper around the material so fed forward, means operated by the movement of the plastic material as it emerges from the nozzle to stop the said feeding means, and means also operated by the said feeding movement of the material to start the operation of the folding means.

3. The combination with a receiver for plastic material, and a discharge nozzle therefor, of expelling means for feeding the plastic material through the discharge nozzle, means for segregating portions of the material so fed, a carrier for receiving the segregated portions of the material, folding means for folding a wrapper around such segregated portions of material, means operated by the movement of the plastic material as it emerges from the nozzle to stop the said feeding thereof and also to start the operation of the folding means.

4. The combination with a receiver for plastic material, and a discharge nozzle therefor, of expelling means for feeding the plastic material through the discharge nozzle, means for segregating portions of the material so fed, a carrier for receiving the segregated portions of the material, folding means for performing folding operations upon a wrapper upon such segregated portions of the material, means operated by the movement of the plastic material as it emerges from the nozzle to stop the feeding thereof and also to start the operation of the folding means and of the means for imparting movements to the carrier.

5. The combination with a receiver for plastic material, and a discharge nozzle therefor, of expelling means for feeding the plastic material through the discharge nozzle, means for segregating portions of the material so fed, a carrier for receiving the segregated portions of the material, folding means for performing folding operations upon a wrapper upon such segregated portions of the material while in the said carrier, means operated by the movement of the plastic material as it emerges from the nozzle to stop the feeding thereof, and means also operated thereby for imparting movements to the carrier and for operating the said folding means.

6. The combination with a receiver for plastic material, and a discharge nozzle therefor, of expelling means for feeding the plastic material through the discharge nozzle, a carrier for receiving the same, means for imparting movements to the carrier, folding means for folding a wrapper around the material so fed, and means operated by the movement of the plastic material as it emerges from the nozzle to start the operation of the folding means and of the means for imparting movements to the carrier.

7. The combination with a receiver for plastic material, and a discharge nozzle therefor, of expelling means for feeding the plastic material through the discharge nozzle, means for segregating portions of the material so fed, folding means for performing folding operations upon a wrapper upon such segregated portions of the material, means operated by the movement of the plastic material as it emerges from the nozzle to start the operation of the said segregating and folding means.

8. The combination with a receiver for plastic material, and a discharge nozzle therefor, of expelling means for feeding the plastic material through the discharge nozzle, means for segregating portions of the material so fed, a carrier for receiving such segregated portions of the material, means for imparting movements to the carrier, folding means for performing folding operations upon a wrapper upon such segregated portions of the material, means operated by the movement of the plastic material as it emerges from the nozzle to start the operation of the segregating means, the folding means, and the means for imparting movements to the carrier.

9. The combination with a receiver for plastic material, and a discharge nozzle therefor, of expelling means for feeding the plastic material through the discharge nozzle, means for segregating portions of the material so fed, folding means for performing folding operations upon a wrapper upon such segregated portions of the material, means operated by the movement of the plastic material as it emerges from the nozzle to stop the feeding thereof and for starting the operation of the segregating and folding means.

10. The combination with a receiver for plastic material, and a discharge nozzle therefor, of expelling means for feeding the plastic material through the discharge nozzle, means for segregating portions of the material so fed, a carrier for receiving the segregated portions of the material, means for imparting movements to the carrier, folding means for performing folding operations upon a wrapper upon such segregated portions of the material, means operated by the movement of the plastic material as it emerges from the nozzle to stop the feeding thereof and also to start the operation of the segregating means, the folding means, and of the means for imparting movements to the carrier.

11. The combination with a receiver for plastic material, and a discharge nozzle therefor, of a train of mechanism including expelling means for feeding the plastic material through the discharge nozzle and another train of mechanism including folding means for folding a wrapper around the material so fed forward, means operated by the feeding movement of the plastic material as it emerges from the nozzle for stopping the operation of the first said train of mechanism and starting the operation of the second said train of mechanism, and means operated by the second said train of mechanism at a predetermined point of its movement for stopping its operation, and for restarting the operation of the first said train of mechanism.

12. The combination with a receiver for plastic material, and a discharge nozzle therefor, of a train of mechanism including expelling means for feeding the plastic material through the discharge nozzle and another train of mechanism including a carrier for receiving the material so fed, means for imparting movements to the carrier, and folding means for folding a wrapper around the material in the carrier, means operated by the feeding movement of the plastic material as it emerges from the nozzle for stopping the operation of the first said train of mechanism and starting the operation of the second said train of mechanism, and means operated by the second said train of mechanism at a predetermined point of its movement for stopping its operation, and for restarting the operation of the first said train of mechanism.

13. The combination with a receiver for plastic material, and a discharge nozzle therefor, of a train of mechanism including expelling means for feeding the plastic material through the discharge nozzle and another train of mechanism including means for segregating portions of the material so fed and folding means for performing folding operations upon a wrapper upon such segregated portions of the material, means operated by the feeding movement of the plastic material as it emerges from the nozzle for stopping the operation of the first said train of mechanism and starting the operation of the second said train of mechanism, and means operated by the second said train of mechanism at a predetermined point of its movement for stopping its operation, and for restarting the operation of the first said train of mechanism.

14. The combination with a receiver for plastic material, and a discharge nozzle therefor, of a train of mechanism including expelling means for feeding the plastic material through the discharge nozzle another train of mechanism including means for segregating portions of the material so fed, a carrier for receiving such segregated portions of the material, means for imparting movements to the carrier, and folding means for performing folding operations upon a wrapper upon such segregated portions of the material, means operated by the feeding movement of the plastic material as it emerges from the nozzle for stopping the operation of the first said train of mechanism and starting the operation of the second said train of mechanism, and means operated by the second said train of mechanism at a predetermined point of its movement for stopping its operation and for restarting the operation of the first said train of mechanism.

15. The combination with a receiver for plastic material, and a discharge nozzle therefor, of a train of mechanism including expelling means for feeding the plastic material through the discharge nozzle another train of mechanism including a carrier for receiving the material so fed, means for imparting movements to the carrier and folding means for folding a wrapper around the material so fed, means operated by the feeding movement of the plastic material as it emerges from the nozzle for stopping the operation of the first said train of mechanism and starting the operation of the second said train of mechanism, and means operated by the carrier in its movement for stopping the operation of the second said train of mechanism and for restarting the operation of the first said train of mechanism.

16. The combination with a receiver for plastic material, and a discharge nozzle therefor, of a train of mechanism including expelling means for feeding the plastic material through the discharge nozzle another train of mechanism including means for segregating portions of the material so fed, a carrier for receiving such segregated portions of the material, means for imparting movements to the carrier and folding means for performing folding operations upon a wrapper upon such segregated portions of the material, means operated by the feeding movement of the plastic material as it emerges from the nozzle for stopping the operation of the first said train of mechanism and starting the operation of the second said train of mechanism, and means operated by the carrier in its movement for stopping the operation of the second said train of mechanism and for restarting the operation of the first said train of mechanism.

17. In a wrapping machine the combination with feeding and wrapping means, of a rotatable carrier, a plurality of receivers equi-distantly arranged around the same, each said receiver comprising a slide radially movable in the carrier, side fingers laterally movable with respect to the slide, and a portion longitudinally movable with respect to the slide; and means for moving the said receivers radially in the carrier.

18. In a wrapping machine the combination with feeding and wrapping means, of a rotatable carrier, a plurality of receivers equi-distantly arranged around the same, each said receiver comprising a slide radially movable in the carrier, spring pressed fingers laterally movable with respect to the slide, and a portion longitudinally movable with respect to the slide; and means for moving said receivers radially in the carrier and for simultaneously moving the said side fingers apart against their spring tension.

19. In a wrapping machine the combination with feeding and wrapping means, of a rotatable carrier, a plurality of receivers equi-distantly arranged around the same, each said receiver comprising a slide radially movable in the carrier, spring pressed side fingers laterally movable with respect to the slide, and a portion longitudinally movable with respect to the slide, means for moving the said receivers radially in the carrier, and means for independently moving the said radially movable portions of the receivers.

20. In a wrapping machine the combination with feeding and wrapping means, of a rotatable carrier, a plurality of receivers equi-distantly arranged around the same, each said receiver comprising a slide radially movable in the carrier, spring pressed side fingers laterally movable with respect to the slide, and a portion longitudinally movable with respect to the slide, means for moving the said receivers radially in the carrier, and for simultaneously moving the said side fingers apart against their spring actuation, and means for independently moving the said longitudinally movable portion of the carrier.

21. In a wrapping machine the combination with feeding and wrapping means, of a rotatable carrier, a plurality of receivers equi-distantly arranged around the same, each said receiver comprising a slide radially movable in the carrier, side fingers laterally movable with respect to the slide, and a portion longitudinally movable with respect to the slide; means for moving the said receivers radially in the carrier, and means for imparting intermittent step by step movements of rotation to the carrier.

22. In a wrapping machine the combination with feeding and wrapping means, of a rotatable carrier, a plurality of receivers equi-distantly arranged around the same, each said receiver comprising a slide radially movable in the carrier, spring pressed fingers laterally movable with respect to the slide, and a portion longitudinally movable with respect to the slide; means for moving said receivers radially in the carrier and for simultaneously moving the said side fingers apart against their spring tension, and means for imparting intermittent step by step movements of rotation to the carrier.

23. In a wrapping machine the combination with feeding and wrapping means, of a rotatable carrier, a plurality of receivers equi-distantly arranged around the same, each said receiver comprising a slide radially movable in the carrier, spring pressed side fingers laterally movable with respect to the slide, and a portion longitudinally movable with respect to the slide, means for moving the said receivers radially in the carrier, means independently moving the said radially movable portions of the receivers, and means for imparting intermittent step by step movements of rotation to the carrier.

24. In a wrapping machine the combination with feeding and wrapping means, of a rotatable carrier, a plurality of receivers equi-distantly arranged around the same, each said receiver comprising a slide radially movable in the carrier, spring pressed side fingers laterally movable with respect to the slide, and a portion longitudinally movable with respect to the slide, means for moving the said receivers radially in the carrier, and for simultaneously moving the said side fingers apart against their spring actuation, means for independently moving the said longitudinally movable portion of the carrier, and means for imparting intermittent step by step movements of rotation to the carrier.

25. In a wrapping machine the combination with feeding and wrapping means, of a rotatable carrier, a plurality of receivers equi-distantly arranged around the same, each said receiver comprising a slide radially movable in the carrier, side fingers laterally movable with respect to the slide, and a portion longitudinally movable with respect to the slide; means for imparting intermittent step by step movements of rotation to the carrier, and means for moving the receivers radially in the carrier while the carrier is at rest.

26. In a wrapping machine the combination with feeding and wrapping means, of a rotatable carrier, a plurality of receivers equi-distantly arranged around the same, each said receiver comprising a slide radially movable in the carrier, spring pressed fingers laterally movable with respect to the slide, and a portion longitudinally movable with respect to the slide, means for imparting intermittent step by step movements of rotation to the carrier, and means for moving the receivers radially in the carrier while the carrier is at rest, and for simultaneously moving the said side fingers apart against their spring tension.

27. In a wrapping machine the combination with feeding and wrapping means, of a rotatable carrier, a plurality of receivers equi-distantly arranged around the same, each said receiver comprising a slide radially movable in the carrier, spring pressed side fingers laterally movable with respect to the slide, and a portion longitudinally movable with respect to the slide, means for imparting intermittent step by step movements of rotation to the carrier, means for moving the said receivers radially in the carrier while the carrier is at rest, and means for independently moving the said radially movable portions of the receivers.

28. In a wrapping machine the combination with feeding and wrapping means, of a rotatable carrier, a plurality of receivers equi-distantly arranged around the same, each said receiver comprising a slide radially movable in the carrier, spring pressed side fingers laterally movable with respect to the slide, and a portion longitudinally movable with respect to the slide, means for imparting intermittent step by step movements of rotation to the carrier, means for moving the receivers radially in the carrier while the carrier is at rest, and for simultaneously moving the said side fingers apart against their spring actuation, and means for independently moving the said longitudinally movable portion of the carrier.

29. In a wrapping machine the combination with feeding and wrapping means, of a rotatable carrier, a plurality of radially movable receivers equi-distantly arranged around the same, a stationary ring arranged for engagement with the said receivers while the carrier is rotating, said stationary ring having a cut away portion for permitting the said receivers to move radially at a predetermined point of rest of the said carrier, and means for imparting step by step movements of rotation to the carrier.

30. In a wrapping machine the combination with feeding and wrapping means, of a rotatable carrier, a plurality of radially movable receivers equi-distantly arranged around the same, a stationary ring for engagement with the said receivers while the carrier is rotating, and also while the carrier is at certain of its rest positions, said stationary ring having a cut away portion for permitting the said receivers to move radially at a predetermined point of rest of the said carrier, and means for imparting step by step movements of rotation to the carrier.

31. In a wrapping machine the combination with feeding and wrapping means, of a rotatable carrier, a plurality of receivers equi-distantly arranged around the same, each said receiver including a slide having dependent flanges, a stationary ring for engaging the said flanges while the carrier is rotating, said ring having a cut away portion for permitting the movement of the said slide at a predetermined point of rest of the carrier, means for engaging the flanges of the slide to reciprocate the said slide radially in the carrier at such point of rest, and means for imparting intermittent movements of rotation to the carrier.

32. In a wrapping machine the combination with feeding and wrapping means, of a rotatable carrier, a plurality of receivers equi-distantly arranged around the same, each said receiver comprising a slide mounted to move radially in the said carrier, and a portion having a relative longitudinal movement in the said slide, means for locking the slides again movement while the carrier is rotating, means for reciprocating the said slides at a predetermined point of rest of the carrier, means for independently moving the said movable portion of the receivers while the carrier is rotating, and means for imparting intermittent step by step movements of rotation to the carrier.

33. In a wrapping machine the combination with feeding and wrapping means, of a rotatable carrier, a plurality of receivers equi-distantly arranged around the same, each said receiver comprising a slide mounted to move radially in the said carrier, and a portion having a relative longitudinal movement in the said slide, means for locking the slides against movement while the carrier is rotating, means for reciprocating the said slides at a predetermined point of rest of the carrier, a stationary cam for moving the said movable portions of the receiver while the carrier is rotating, and means for imparting step by step movements of rotation to the said carrier.

34. In a wrapping machine the combination with feeding and wrapping means, of a rotatable carrier, a plurality of receivers equidistantly arranged around the same, each said receiver comprising an element radially movable in the carrier, means for imparting step by step movements of rotation to the said carrier and receivers carried thereby, driving means, and clutch mechanism for connecting the same in driving relation with the feeding means or with the means for imparting step by step movements to the carrier, the said clutch mechanism being operated in one direction by the radial movement of a receiver element and operated in the other direction by the rotative movement of the next succeeding element in the carrier.

35. In a wrapping machine the combination with feeding and wrapping means, of a rotatable carrier, a plurality of receivers equidistantly arranged around the same, each said receiver comprising a slide mounted to move radially in the said carrier and an element arranged to move longitudinally in the said slide, means for imparting step by step movements to the carrier, means for imparting radial movements to the receivers, means for imparting independent movements to the said receiver elements toward and away from the center of rotation of the carrier, a clutch mechanism, driving means, means operated by the said receiver element in its movement toward the center of rotation of the carrier to operate the clutch mechanism in one direction, to connect the said driving means with the said means for imparting step by step movements to the carrier, and means operated by the rotative movement of the next successive receiver element to operate the clutch in the other direction whereby the said driving means is disconnected from its engagement with the means for imparting step by step movements to the carrier, and is connected with the said feeding means.

36. In a wrapping machine the combination with a rotatable carrier provided with a plurality of receivers for receiving articles to be wrapped, equidistantly arranged around the said carrier, a plurality of mechanisms for operating simultaneously upon articles held in several of the said receivers, driving means, a mutilated gear driven by the driving means for imparting movements therefrom to the said plurality of mechanisms and another mutilated gear for imparting step by step movements to the said carrier, the one of the said mutilated gears arranged to be active while the other is inactive.

37. In a wrapping machine the combination with feeding and wrapping means, of a rotatable carrier, a plurality of receivers equidistantly arranged around the same, a gear wheel mounted to rotate freely about an axis coincident with the axis of rotation of the carrier, a pinion in engagement with the said central gear, driving means for the pinion, other pinions in engagement with the said central gear and driven thereby, mechanisms actuated by the said pinions for operating upon articles in several of the said receivers, means for intermittently rotating the pinion for driving the central gear, and means for imparting intermittent movements of rotation to the said carrier.

38. In a wrapping machine the combination with feeding means, a rotatable carrier and a plurality of receivers carried thereby, each said receiver comprising a radially movable slide and fingers adapted to move laterally in opposite directions, of means for reciprocating the said receivers toward and away from the said feeding means and for simultaneously operating the said fingers thereof, and means for imparting step by step movements of rotation to the carrier.

39. In a wrapping machine, the combination with means for folding a wrapper in trough-like form around an article, whereby the two opposite side portions of the wrapper extend beyond the face of the article in parallel relation, of a single rotary folding member for folding the two said projecting side portions down upon the face of the article, the said folding member being mounted to rotate about an axis at right angles to the longitudinal axis of the trough-like wrapper, and having parts provided with oppositely disposed engaging edges facing toward each other, for successively engaging the two said projecting side portions thereof.

40. In a wrapping machine the combination with means for folding a wrapper in trough-like form around an article, whereby the two opposite side portions of the wrapper extend in parallel relation beyond the face of the article, of a folding member pivoted to rotate about an axis at right angles to the face of the article, said member having two rigidly secured folding blades provided with oppositely disposed engaging edges facing toward each other and adapted to successively engage and fold the projecting wrapper portions down upon the face of the article.

41. In a wrapping machine the combination with means for folding a wrapper in trough-like form around an article, whereby the two opposite side portions of the wrapper extend in parallel relation beyond the face of the article, of a rotatable folding member having a plane face adapted to move in a path parallel with the face of the article, said member comprising two arms, 135 and 136 substantially as shown, rigidly connected together, the said arms being adapted to engage and fold the two projecting portions of the wrapper successively down upon the face of the article.

42. In a wrapping machine, the combination with folding means for partially inclosing an article with a wrapper, the wrapper after having been operated upon by such folding means having portions upon opposite sides of the article which project laterally from the face of the article in parallel relation, of a rotatable folding member having a plane face adapted to move parallel with that face of the article from which the wrapper portions project, the said member comprising an arm which projects from the axis of the member in one direction, and a connected return portion constituting another arm which projects in substantially the opposite direction, the operating edges of the two said arms facing toward each other.

43. In a wrapping machine the combination with means for folding a wrapper in trough-like form around an article, whereby the two side portions of the wrapper extend beyond the face of the article, of a rotary folding member arranged to rotate across the face of the article in a path parallel thereto and to thereby fold the projecting sides of the wrapper down upon the face of the article, plates constituting end tuckers for tucking in the front ends of the wrapper, means for reciprocating the said plates across the plane of the face of the article after the rotary folding member has passed thereover, side tuckers for the side portions of the wrapper ends, carried with the said plates, and means for imparting lateral movements to the said side tuckers during the forward portion of their reciprocating movement.

44. In a wrapping machine the combination with means for folding a wrapper in tube-like form around an article, of side and end tucking members, an element for carrying the side and end tuckers, an operating arm pivotally carried directly by the said element for producing lateral movements of the side tuckers, and means for reciprocating the said element and also for imparting relative movements to the said operating arm.

45. In a wrapping machine the combination with means for folding a wrapper in tube-like form around an article, of side and end tucking members, an element for carrying the side and end tuckers, an operating arm pivotally carried directly by the said element for producing lateral movements of the side tuckers, and arranged for simultaneous engagement with both of them, a cam member for producing reciprocating movements of the said element, and another cam member for producing relative movements of the said operating arm.

46. In a wrapping machine the combination with means for folding a wrapper in tube-like form around an article, of an element mounted to reciprocate toward and away from the longitudinal axis of the wrapper tube, stationary end tuckers carried by the said element, oscillating arms comprising side tuckers also carried by the said element, an operating member for producing oscillations of the said arm pivoted to the said element, means for reciprocating the said element, the said operating member being pivoted directly to the said tucker carrying element, and means for also moving the said operating arm relatively to the said element.

47. In a wrapping machine the combination with means for folding a wrapper in tube-like form around an article, of an element mounted to reciprocate toward and away from the longitudinal axis of the wrapper tube, stationary end tuckers carried by the said element, oscillating arms comprising side tuckers also carried by the said element, an operating arm pivoted to the said element, said operating arm having a wedge-like portion for insertion between the said oscillating arms to produce oscillating movements thereof, a rotary cam having one member or portion thereof for producing reciprocating movements of the said element, and another member or portion thereof for also producing relative movements of the said operating arm.

JAMES J. SULLIVAN.

Witnesses:
D. HOWARD HAYWOOD,
LYMAN S. ANDREWS, Jr.